G. MILLER.
Sink-Traps.

No. 151,307.

Patented May 26, 1874.

WITNESSES:
E. Wolff
J. Sedgwick

INVENTOR:
G. Miller
BY Munn & Co
ATTORNEYS.

AM. PHOTO-LITHOGRAPHIC Co. N.Y. (OSBORNE'S PROCESS.)

UNITED STATES PATENT OFFICE.

GEORGE MILLER, OF JOHNSTON, RHODE ISLAND, ASSIGNOR TO HIMSELF, HENRY MILLER, AND ALFRED B. IRONS, OF SAME PLACE.

IMPROVEMENT IN SINK-TRAPS.

Specification forming part of Letters Patent No. 151,307, dated May 26, 1874; application filed May 9, 1874.

*To all whom it may concern:*

Be it known that I, GEORGE MILLER, of Johnston, in the county of Providence and State of Rhode Island, have invented a new and Improved Sink-Trap, of which the following is a specification:

My invention consists of revolving scrapers in the trap for stirring up the sediment to be carried away by the water by turning the scrapers by a thumb-bit above the strainer, the scrapers being fixed on the lower edge of the inverted cup of the trap, and the cup being arranged to revolve either with or without the strainers, or on arms or a cup revolving independently of the strainer.

Figure 1:
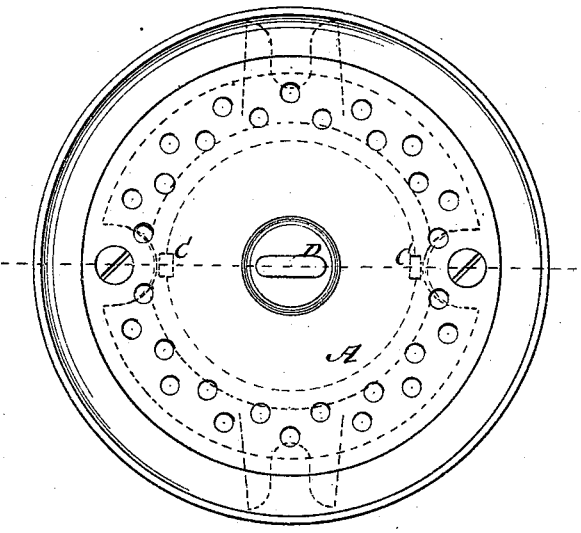
Figure 2:
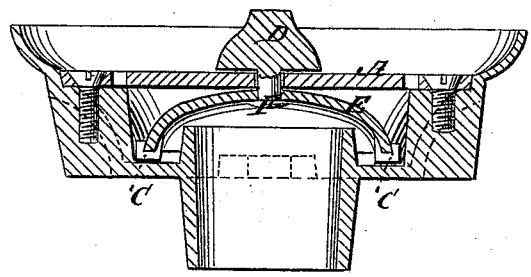
Figure 3:
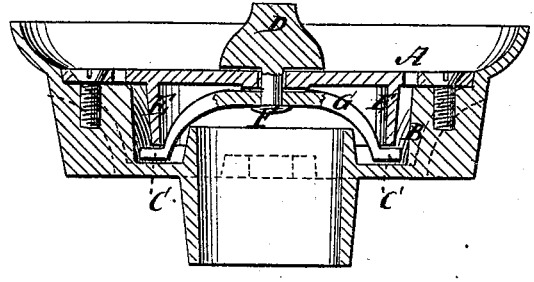

Figure 1 is a plan view of my improved sink-trap. Fig. 2 is a sectional elevation, showing the scrapers fixed on a revolving cup. Fig. 3 is a sectional elevation, showing the scrapers on revolving arms and the cup cast on the strainer.

Similar letters of reference indicate corresponding parts.

A is the strainer; B, the trap; and C the scrapers in the trap for being revolved by the thumb-bit D from time to time to scrape up the sediment for the water to carry it away and clean out the trap. In Fig. 2 said scrapers are mounted on the inverted cup E, which is suspended from the pivot F of the thumb-bit, but in Fig. 3 the cup E is cast on the strainer, and the scrapers are fixed on revolving arms G, attached to the pivot, but they may be attached to the cup and the cup be revolved by revolving the strainer. This contrivance saves the labor of unscrewing the strainer and screwing it down again every time the trap needs cleaning out.

Having thus described my invention, what I claim as new, and desire to secure by Letters Patent, is—

The combination of scrapers C and a thumb-bit for turning them with a sink-trap, the scraper being mounted on revolving arms or a revolving cup, substantially as specified.

GEORGE MILLER.

Witnesses:
ROBERT WILSON,
THOMAS J. LOFTUS.